(12) United States Patent
Flockhart et al.

(10) Patent No.: US 6,463,346 B1
(45) Date of Patent: Oct. 8, 2002

(54) WORKFLOW-SCHEDULING OPTIMIZATION DRIVEN BY TARGET COMPLETION TIME

(75) Inventors: Andrew D. Flockhart, Thornton; Darryl J. Maxwell, Lafayette; Keith Robert McFarlane, Aurora; Paul L. Richman; Lucinda M. Sanders, both of Boulder, all of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/415,577

(22) Filed: Oct. 8, 1999

(51) Int. Cl.$^7$ ................................................ G06F 19/00
(52) U.S. Cl. ..................... 700/102; 700/100; 705/8; 379/266.01
(58) Field of Search ................ 379/266.01, 266.02, 379/266.03, 266.04, 266.06, 266.05; 700/28, 32, 33, 341, 242, 100, 101, 102; 706/19; 705/8, 9

(56) References Cited

U.S. PATENT DOCUMENTS

| | | | | |
|---|---|---|---|---|
| 5,170,355 A | * | 12/1992 | Hadavi et al. | ............... 700/102 |
| 5,291,397 A | * | 3/1994 | Powell | ........................ 700/100 |
| 5,446,671 A | * | 8/1995 | Weaver et al. | ............... 700/100 |
| 5,506,898 A | * | 4/1996 | Constantini et al. | ... 379/265.04 |
| 5,612,886 A | * | 3/1997 | Weng | ......................... 700/101 |
| 5,751,580 A | * | 5/1998 | Chi | ............................ 700/100 |
| 5,890,134 A | * | 3/1999 | Fox | ............................ 700/100 |
| 6,115,640 A | * | 9/2000 | Tarumi | ...................... 700/100 |
| 6,130,942 A | * | 10/2000 | Stenlund | ..................... 376/266 |
| 6,353,769 B1 | * | 3/2002 | Lin | ............................. 700/101 |

* cited by examiner

Primary Examiner—Leo Picard
Assistant Examiner—Paul Rodriguez
(74) Attorney, Agent, or Firm—David Volejnicek

(57) ABSTRACT

The flow of work items (40) through a workflow process (50) is optimized by repeatedly reordering (FIG. 3) work items enqueued in inbox queues (21) of workflow process tasks (500) to maximize results according to a given business strategy expressed through target times. Each enqueued work item has an associated in-queue rating (IQR 28) that represents the number of queue positions (23) that the work item can be retarded or needs to be advanced to meet its target time. When a work item enters a queue and whenever a work item changes its queue position, its IQR is computed. An optimization function is then performed (404) on the queue to determine an order of the enqueued work items that optimizes a metric of those work items that may fail to meet their target times. The work items in the queue are then reordered (406) accordingly.

15 Claims, 3 Drawing Sheets

FIG. 4
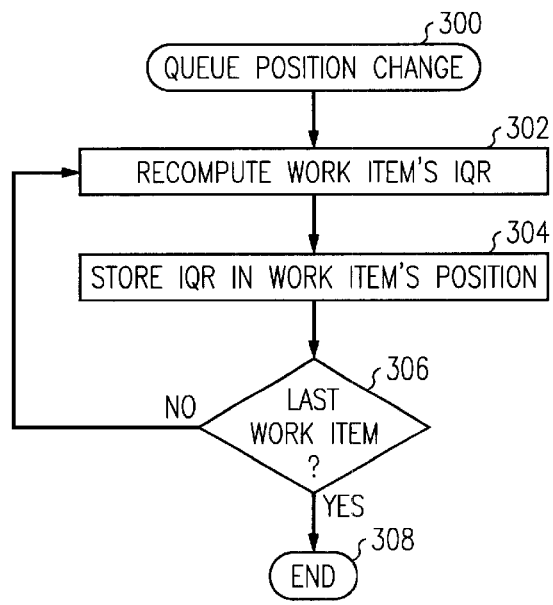
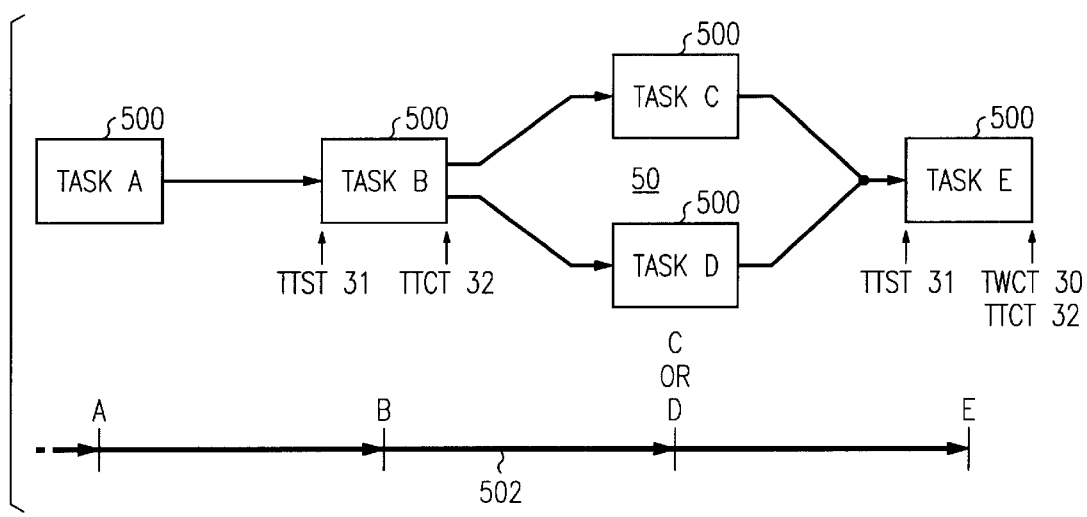
FIG. 5

WORKFLOW-SCHEDULING OPTIMIZATION DRIVEN BY TARGET COMPLETION TIME

TECHNICAL FIELD

This invention relates to workflow management.

BACKGROUND OF THE INVENTION

In a workflow, work items—whether physical items such as products and paper documents or virtual items such as communications and electronic documents—progress through a series of one or more task stations, where each task station has an inbox queue for work items waiting to be serviced as well as resources that service work items retrieved from the inbox queue. As work items progress through the workflow, it is practically inevitable that some work items will make slower progress than others. This is due to the nature of the work items themselves (for example, a status-inquiry call is likely to take a different amount of time to handle than an order call) as well as to the different capabilities of the resources that are servicing the work items (for example, different levels of expertise of call center agents who are handling the calls). This results in some work items progressing through the workflow ahead of schedule while others fall behind schedule.

It is desirable for the workflow to make automatic adjustments to bring each work item to completion on or ahead of its schedule as determined according to a given business strategy. For example, when a workflow is overloaded with work items, one business strategy is to bring all work items to completion a short time behind schedule (i.e., "share the pain"), while another business strategy is to maximize the number of on-schedule work items at the sacrifice of significantly delaying a small percentage of work items that have already fallen behind. Various extraneous data can also play a part in the business strategy. For example, in a call center application with known customers, such as account holders, the business strategy may require that tasks for preferred customers be completed on schedule at the expense of regular customers when necessary. Workflow adjustments to achieve such business strategies generally are difficult to implement automatically. Therefore, the prior art has usually adopted the approach of initially assigning work items to different inbox queues based on the adopted business strategy, and then servicing the work items from each queue in a first-in, first-out and/or priority order. Servicing items on this basis does little or nothing to correct the schedules of "at risk" work items or to optimize the business results of workflows with different business strategies, however.

SUMMARY OF THE INVENTION

This invention is directed to solving these and other problems and disadvantages of the prior art. Generally according to the invention, work items in a queue are repeatedly reordered to maximize results according to a given business strategy that is expressed through target completion times and deviances therefrom. Specifically according to the invention, in a queue that has an ordered plurality of work items that are waiting to be worked and each one of those items has a target completion time, the amount of the target completion time of an item that has already expired (e.g., the amount of the target completion time that the item has already spent in processing and in the queue) and the amount of additional time that is likely to expire before the item is worked (e.g., the position of the item in the queue times the rate of advance of the item between queue positions) is used to determine whether the item either may be retarded or needs to be advanced in the queue, relative to the other items in the queue, in order to meet its target completion time. Preferably, the determination is of the number of queue positions that the item may or needs to be moved, and is computed as the difference between the target completion time and the sum of the above-mentioned expired time and additional likely time, divided by the rate of advance and rounded down. Based on the determination, the items in the queue are then reordered to optimize a metric of items that may fail to meet their target completion times (e.g., those items that need to be advanced in the queue). Illustratively, an optimization function is performed on the queue to determine an order that optimizes the metric (e.g., that minimizes a number of the items that will fail to meet their target completion times or that minimizes the amount of time by which the items will exceed their target completion times), and the items in the queue are reordered accordingly.

The determination and reordering are preferably performed when the item enters the queue or each time that an item changes position in the queue. The order of the enqueued items is thus frequently adjusted to maximize whatever business strategy, expressed through target completion times and deviances therefrom, is being pursued. With the invention, the status of each work item in the inbox queue is uniquely classified, and the needs and consequences of advancing or retarding any given item can be easily evaluated. Particularly advantageous is tying the number of positions that an item can be advanced or retarded to the inqueue rate of advance. This allows the consequences of any reordering of work items to be clearly evaluated. For example, if all that the system knew was that one item was ahead of schedule by "x" minutes and another item was behind schedule by "y" minutes, the system would not directly know whether swapping positions of the one and the other items would put the other item back on schedule or whether it would cause the one item to now fall behind schedule. But if this information is tied to the in-queue advance time, the system is capable of easily evaluating the requirements and consequences of any reordering. Whether or not any reordering takes place, and the nature of it, depends on the business strategy of the workflow. Another advantage is that different target completion times can be set for individual work items in the same workflow. Work items with aggressive schedules are then automatically advanced through the workflow at a faster rate than other work items. This allows the system to support a substantially-unlimited number of priority levels for each workflow.

The invention encompasses both method and apparatus. While the method comprises the steps of the just-characterized procedure, the apparatus effects the method steps. It preferably includes an effector—any entity that effects the corresponding step, unlike a means—for each method step. Further according to the invention, there is provided a computer-readable medium containing software which, when executed in a computer, causes the computer to perform the method steps.

These and other advantages and features of the invention will become more apparent from the following description of an illustrative embodiment of the invention considered together with the drawing.

BRIEF DESCRIPTION OF THE DRAWING

FIG. 4 is a flow diagram of operations of the SEQ function upon a change in the in-queue position of a work item in a queue of the center of FIG. 1; and FIG. 5 is a flow diagram of an illustrative workflow definition of the center of FIG. 1.

DETAILED DESCRIPTION

Figure 1:
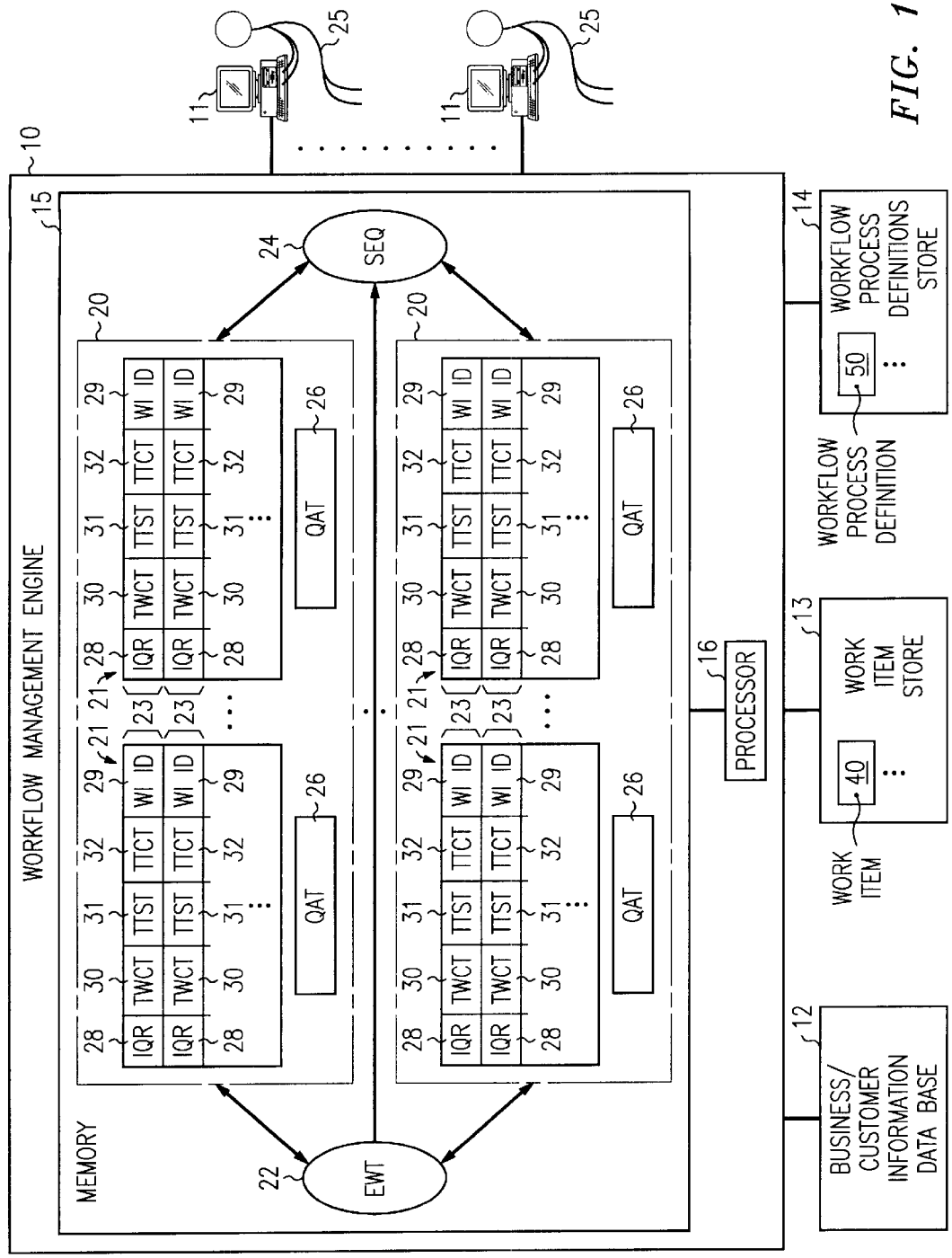
FIG. 1 is a block diagram of a processing center that includes an illustrative embodiment of the invention.

FIG. 1 shows an illustrative work processing center that comprises a workflow management engine 10 serving a plurality of task stations 11 where work items 40—illustratively electronic documents in this example, such as loan applications—are processed, e.g., by agents 25. Workflow management engine 10 sends each work item 40 to one or more task stations 11 for processing in a sequence determined by the item's workflow definition 50. An illustrative workflow definition 50 is shown in FIG. 5. A workflow definition 50 is a sequence 502 of one or more tasks (A–E) 500. Each task 500 is generally performed by a different task station 11. The same task 500 may be performed by a plurality of stations 11. Different sets of work items 40 may have different workflow definitions 50. Workflow definitions 50 are stored in a workflow definitions store 14. Work items 40 themselves are stored in a work item store 13. As described so far, the work processing center of FIG. 1 is conventional.

As is also conventional, workflow management engine 10 is a stored-program-controlled unit that includes a memory 15 comprising one or more different memory units for storing programs and data, and a processor 16 for executing the stored programs and using the stored data in their execution. Memory 15 includes a plurality of sets 20 of inbox queues 21. Each set 20 of queues 21 conventionally serves a different workflow 50. Within each set 20, each queue 21 serves a different task 500. Each queue 21 functions as a first-in, first-out (FIFO) buffer memory, and includes a plurality of entries, or positions 23, each for a corresponding one enqueued work item 40. The position 23 at the head of queue 21 is considered to be position number 1, the next subsequent position 23 in queue 21 is considered to be position number 2, etc.

Memory 15 further includes an estimated wait time (EWT) function 22. As its name implies, this function determines an estimate of how long a work item 40 that is placed in a queue 21 will have to wait before being connected to a station 11 for processing. The estimate is derived separately by EWT function 22 for each queue 21. It is based on the average rate of advance of work items 40 through positions 23 of queue 21; this rate of advance is also computed by EWT function 22. An illustrative implementation of EWT function 22 is disclosed in U.S. Pat. No. 5,506,898.

According to the invention, work items 40 are assigned time goals for completing the whole workflow defined by the corresponding workflow definition 50, and/or for starting and/or completing each task 500 within that workflow. Accordingly, each work item 40 in queue 21 has its own associated target workflow completion time (TWCT) 30, target task start time (TTST) 31 and/or target task completion time (TTCT) 32, and item queue rating (IQR) 28. These are stored along with the work item's identifier (WIID) 29 in the work item's present position 23 in queue 21. Furthermore, each queue 21 has its own-associated queue advance time (QAT) 26. Alternatively, each queue 21 may have target times 31–32 that are common to all work items 40 in that queue 21. TWCT 30 is administered according to customer commitments or internal business goals derived from contents of a business/customer information database 12, and represents either the maximum amount of time that the work item 40 should spend in the corresponding workflow, or the absolute (calendar or clock) time by which the processing of work item 40 should be finished. TTST 31 is the maximum time that work item 40 should spend in queue 21 corresponding to this task 500. TTCT 32 is the time in which the task 500 should be completed and the work item be passed on to the next task in the workflow sequence. TTST 31 and TTCT 32 are administered based on the work item's TWCT 30 and on historical performance measures for the corresponding task. Times 31 and 32 are also expressed either as amounts of time or as absolute times. The relationship between times 31 and 32 may be expressed as TTCT=TTST+AHT, where AHT is the average handling time of a work item 40 by a task station 11 that corresponds to this task 500. QAT 26 is a measure of the average time that it takes for a work item 40 to advance one position 23 toward the head of that queue 21, periodically calculated by EWT 22 illustratively in the manner described in U.S. Pat. No. 5,506,898. And IQR 28 is an indication of the number of positions 23 that the corresponding work item 40 is ahead of or behind schedule in meeting its TTST 31 or TTCT 32. Hence, IQR 28 represents the number of positions 23 that a work item 40 either may be retarded or needs to be advanced in queue 21 to remain on schedule.

For example, assume that TTST 31 of a work item 40 in queue 21 is 15 minutes from the present time. If QAT 26 for queue 21 is presently 2 minutes, and work item 40 is in the third position 23 from the head of this queue 21, work item 40 is 9 minutes ahead of schedule in this queue 21. The work item is assigned an IQR of +4, which means that this work item 40 is ahead of schedule and can afford to lose four positions 23 in queue 21 and still remain on schedule. Conversely, an IQR of –1 would mean that work item 40 is behind schedule but could be brought back on schedule if it were advanced by one position 23 in queue 21. And if TTST 31 in this example were 9 minutes or QAT 26 were 4 minutes, the work item's IQR 28 would be 0, meaning that work item 40 is just on schedule.

Figure 2:
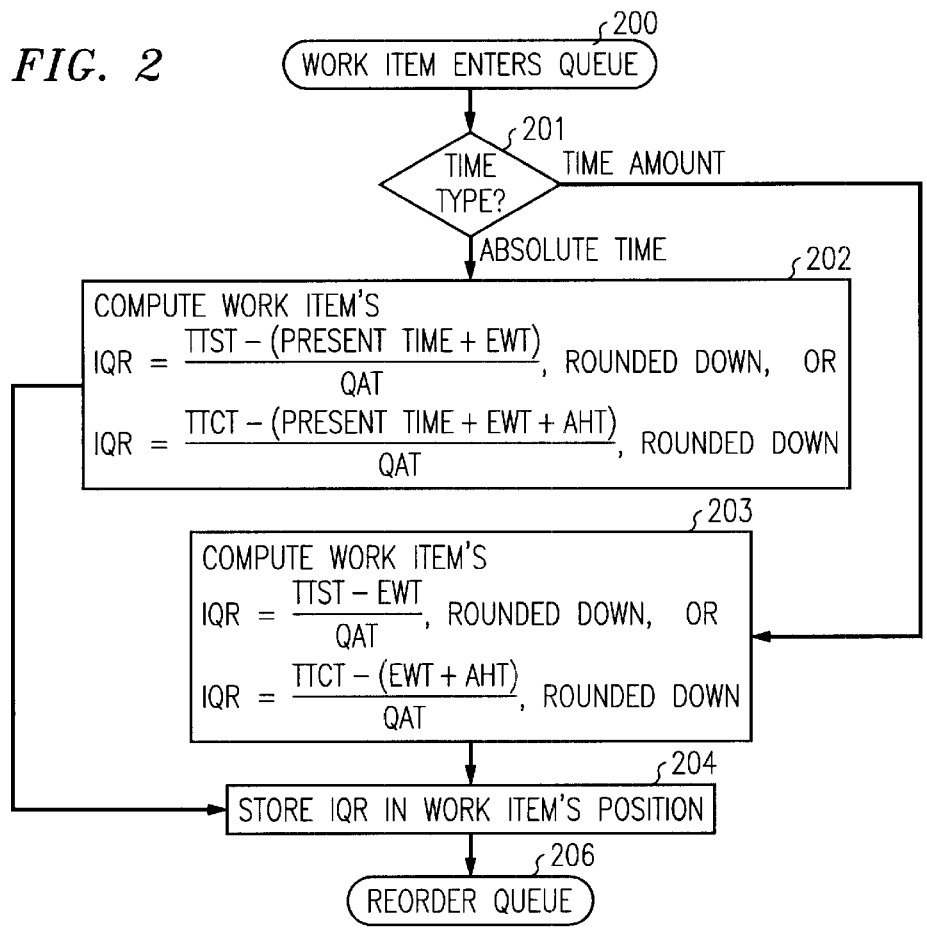
FIG. 2 is a flow diagram of operations of an SEQ function of the center of FIG. 1 upon a work item entering a queue of the center of FIG. 1.
Figure 3:
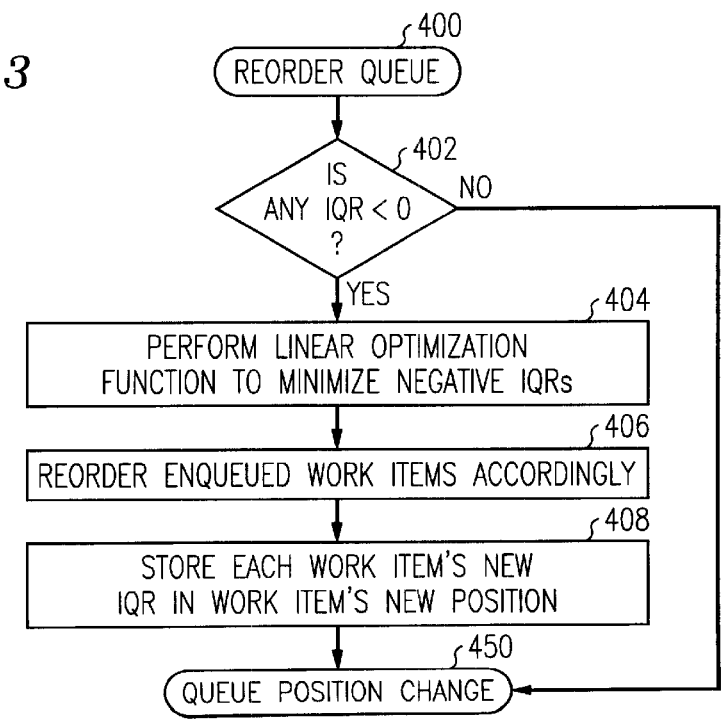
FIG. 3 is a flow diagram of operations of the SEQ function upon invocation of reordering of a queue in the center of FIG. 1.

Memory 15 further includes a call-sequencing (SEQ) function 24 which calculates and uses IQRs 28. Its functionality is shown in FIGS. 2–4. When a call becomes enqueued in a queue 21, at step 200 of FIG. 2, function 24 computes its IQR 28, at step 202 or 203. If target times are expressed as absolute times, as determined at step 201, then IQR 28 is computed at step 202 as (a) either (i) the time sum of the present time and EWT of the work item 40 subtracted from TTST 31 of that work item 40, or (ii) the time sum of the present time, the EWT of the work item 40, and the AHT for this task subtracted from TTCT 31 of that work item 40, and (b) the resulting time difference divided by QAT 26 of that queue 21 and rounded down. If target times are expressed as amounts of time, as determined at step 201, then IQR 28 is computed at step 203 as (a) either (i) the difference between TTST 31 and EWT of that work item 40, or (ii) the difference between TTCT 31 of this work item 40 and the sum of the EWT of this item 40 and AHT of this task 500, and (b) the resulting difference divided by QAT 26 of that queue 21 and rounded down. Function 24 then stores the computed IQR 28 in queue position 23 that is occupied by the subject work item 40, at step 204, and then performs a queue 21 reordering, at step 206, which is shown in FIG. 3.

Upon invocation of reordering of a queue 21, at step 400 of FIG. 3, function 24 checks IQRs 28 of all positions 23 in the subject queue 21 to determine if any are less than 0, at step 402. If none are less than zero, it means that all enqueued work items 40 are meeting service objectives, and so function 24 ends its operation, at step 450. If any IQRs 28 are less than zero, function 24 performs a linear optimization function on the subject queue 21 to minimize negative IQRs 28, at step 404. Linear optimization functions are well-known in the art. The minimization may take any one of a number of possible forms, such as minimizing the total number of negative IQRs 28, or minimizing the sum of the values of negative IQRs 28. As a part of this process, function 24 performs the IQR 28 recomputations of step 302 of FIG. 4 for the various permutations of work items 40 that it considers for the subject queue 21. Having come up with a new ordering of enqueued work items 40 at step 404, function 24 now reorders work items 40 and their new IQRs 28 in positions 23 of the subject queue 21 accordingly, at steps 406 and 408. Function 24 then proceeds to perform a queue position change, at step 450. Queue position change is shown in FIG. 4.

Whenever any call in a queue 21 changes position 23, as indicated at step 300 of FIG. 4, function 24 recomputes IQR 28 of every work item 40 in that queue 21, at stop 302. Each work item's IQR 28 is recomputed as the sum of the present IQR 28 and the number of positions 23 that the work item 40 has either advanced (a positive number) or been retarded (a negative number) in that queue 21. Function 24 then stores the computed IQR 28 in queue position 23 that is presently occupied by the subject work item 40, at step 304. When it has recomputed IQRs 28 of all work items 40 enqueued in the subject queue 21, as determined at step 306, function 24 ends its operation, at step 308.

Of course, various changes and modifications to the illustrative embodiment described above will be apparent to those skilled in the art. For example, when EWT function 22 recomputes QAT 26 of a queue 21, the procedure of FIG. 2 may be performed for work items in that queue to recompute their IQRs 28 accordingly. Also, the reorder queue procedure of FIG. 3 may be performed even when no work item in a queue is behind schedule (all IQRs≧0), so as to make all work items in the queue more equally on or ahead of schedule. Also, reporting may identify those work items that are consistently "bad actors" and tag them for manual handling outside of the normal workflow. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of optimizing workflow:
    in a queue having a sequence of a plurality of positions for work items and an ordered plurality of the work items waiting to be worked and each work item having at least one target time including a target start time or a target completion time, determining, from an amount of the target time of an item that has already expired and an amount of additional time that is likely to expire before the item is worked, a number of the positions that the item either may be retarded or needs to be advanced in the queue relative to other said items in the queue to meet its target time; and
    reordering the items in the queue to optimize a metric of items that may fail to meet their target time.

2. The method of claim 1 wherein:
    the amount of the target time of an item that has already expired comprises
        a time that the item has already spent in the queue; and
        the amount of additional time that is likely to expire before the item is worked comprises
            an additional time that the item is likely to remain in the queue.
3. The method of claim 1 wherein:
    said determining is performed for each said item.
4. The method of claim 3 wherein:
    optimizing a metric comprises
        minimizing either (a) a number of the items that will fail to meet their target times, or an amount of time by which the items will exceed their target times.
5. The method of claim 3 wherein:
    reordering comprises
        performing an optimization function on the queue to determine an order of the items in the queue that optimizes the metric of items that may fail to meet their target time; and
        ordering the items in the determined order.
6. The method of claim 1 wherein:
    the sequence of a plurality of positions terminates at a head end;
    each item further has a rate of advance between positions in the sequence;
    the amount of the target time of an item that has already expired comprises a time that the item has already spent in the queue;
    the amount of additional time that is likely to expire before the item is worked involves the rate of advance, and a present position of the item from the head end; and
    the additional number comprises a number of the positions that the item either may be retarded or needs to be advanced in the sequence to meet its target time.
7. A method of optimizing workflow in a queue having an ordered plurality of positions, each for a different one of a plurality of work items waiting to be worked, that terminates at a head end, comprising:
    determining a rate of advance of the work items between the positions,
    in response to an item that has an associated target time including a target start time or a target completion time entering the queue, determining a number of positions that the item either may be retarded or needs to be advanced in the queue as one of (a) the target completion time less a sum of an estimated wait time of the item in the queue and an average handling time of the work item, divided by the rate of advance and rounded down, and (b) the target start time less the estimated wait time of the item in the queue, divided by the rate of advance and rounded down;
    in response to an item changing its position in the queue, redetermining the number of the positions that the item either may be retarded or needs to be advanced;
    performing an optimization function on the queue to determine an order of the items in the queue that optimizes a metric of those items that need to be advanced in the queue in order to meet the target time; and
    reordering the items in the queue in the determined order.
8. The method of claim 7 wherein:
    the order minimizes either (a) a number of the items that need to be advanced in the queue in order to meet their target times, or (b) a total amount of time by which the items will exceed their target times.

9. A method of optimizing a workflow comprising a sequence of a plurality of tasks each having a corresponding queue including a sequence of a plurality of positions for an ordered plurality of work items waiting for the task, comprising:

in each said queue, assigning to each work item at least one target time including a target start time or a target completion time for the corresponding task;

for each work item in each said queue, determining, from an amount of the target time of the item for the corresponding task that has already expired and an amount of additional time that is likely to expire before the item undergoes the corresponding task, a number of the positions that the item either may be retarded or needs to be advanced in the queue relative to other said items in the queue to meet its target time for the corresponding task; and in each said queue, reordering the items to optimize a metric of items that may fail to meet their target time for the corresponding task.

10. The method of claim 9 wherein:

said determining is performed for each item when the item enters any queue and when the item changes its position in any queue; and said reordering is performed for each queue whenever determining is performed for any item in that queue.

11. An apparatus comprising:

a queue having a sequence of a plurality of positions for work items for storing a plurality of the work items waiting to be worked and each work item having at least one target time including a target start time or a target completion time;

means for determining, from an amount of the target time of an item that has already expired and an amount of additional time that is likely to expire before the item is worked, a number of the positions that the item either may be retarded or needs to be advanced in the queue to meet its target time; and means for reordering the items in the queue to optimize a metric of items that may fail to meet their target times.

12. A method of optimizing workflow:

in a queue having an ordered plurality of work items waiting to be worked and each having at least a target start time, the queue further having a sequence of a plurality of positions for the work items that terminates at a head end and wherein each item further has a rate of advance between positions in the sequence, determining, from an amount of the target time of an item that has already expired and an amount of additional time that is likely to expire before the item is worked, whether the item either may be retarded or needs to be advanced in the queue relative to other said items in the queue to meet its target time, including in response to an item entering the queue, determining, from a time that the item has already spent in the queue, the rate of advance, and a present position of the item from the head end, a number of the positions that the item either may be retarded or needs to be advanced in the sequence to meet its target time as: the target completion time less a sum of an estimated wait time of the item in the queue and an average handling time of a work item, divided by the rate of advance and rounded down, in response to an item changing its position in the queue, redetermining the number of the positions that the item either may be retarded or needs to be advanced, and reordering the items in the queue to optimize a metric of items that have a negative said determined number of the positions and thus may fail to meet their target time.

13. A method of optimizing workflow:

in a queue having an ordered plurality of work items waiting to be worked and each having at least a target completion time, the queue further having a sequence of a plurality of positions for the work items that terminates at a head end and wherein each item further has a rate of advance between positions in the sequence, determining, from an amount of the target time of an item that has already expired and an amount of additional time that is likely to expire before the item is worked, whether the item either may be retarded or needs to be advanced in the queue relative to other said items in the queue to meet its target time, including in response to an item entering the queue, determining, from a time that the item has already spent in the queue, the rate of advance, and a present position of the item from the head end, a number of the positions that the item either may be retarded or needs to be advanced in the sequence to meet its target time as: the target start time less an estimated wait time of the item in the queue, divided by the rate of advance and rounded down, in response to an item changing its position in the queue, redetermining the number of the positions that the item either may be retarded or needs to be advanced, and reordering the items in the queue to optimize a metric of items that have a negative said determined number of the positions and thus may fail to meet their target time.

14. An apparatus that effects the method of one of the claims 1–5, 6, 7–10, and 12–13.

15. A computer-readable medium containing instructions which, when executed in a processor, cause the processor to perform the method of one of the claims 1-5, 6, 7–10, and 12–13.

* * * * *